(12) United States Patent
Bian et al.

(10) Patent No.: US 12,189,183 B2
(45) Date of Patent: Jan. 7, 2025

(54) STRUCTURE WITH POLARIZATION DEVICE WITH LIGHT ABSORBER WITH AT LEAST A HOOK SHAPE

(71) Applicant: GlobalFoundries U.S. Inc., Malta, NY (US)

(72) Inventors: Yusheng Bian, Ballston Lake, NY (US); Won Suk Lee, Malta, NY (US); Andreas D. Stricker, Essex Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 231 days.

(21) Appl. No.: 18/046,189

(22) Filed: Oct. 13, 2022

(65) Prior Publication Data
US 2024/0126013 A1 Apr. 18, 2024

(51) Int. Cl.
*G02B 6/126* (2006.01)
*G02B 6/122* (2006.01)
*G02B 6/27* (2006.01)
*G02B 6/12* (2006.01)
*G02B 6/125* (2006.01)

(52) U.S. Cl.
CPC ........... *G02B 6/126* (2013.01); *G02B 6/1228* (2013.01); *G02B 6/2773* (2013.01); *G02B 2006/12126* (2013.01); *G02B 6/125* (2013.01)

(58) Field of Classification Search
CPC ...... G02B 6/1228; G02B 6/125; G02B 6/126; G02B 6/2773; G02B 2006/12126
See application file for complete search history.

(56) References Cited

U.S. PATENT DOCUMENTS

| | | | |
|---|---|---|---|
| 3,787,871 A | 1/1974 | Reese | |
| 9,122,006 B1 | 9/2015 | Roth et al. | |
| 9,366,818 B1 | 6/2016 | Lin et al. | |
| 9,645,312 B2 | 5/2017 | Barwicz et al. | |
| 10,359,569 B2* | 7/2019 | Dumais | G02B 6/243 |
| 10,429,581 B1 | 10/2019 | Thomas et al. | |
| 10,527,792 B2* | 1/2020 | Dumais | G02B 6/243 |
| 10,641,956 B1 | 5/2020 | Bian et al. | |

(Continued)

OTHER PUBLICATIONS

Aboketaf et al., "Towards fully automated testing and characterization for photonic compact modeling on 300-mm wafer platform," W6A.1, OFC 2021, OSA 2021, 3 pages.

(Continued)

*Primary Examiner* — Daniel Petkovsek
(74) *Attorney, Agent, or Firm* — Anthony Canale; Hoffman Warnick LLC

(57) ABSTRACT

A structure includes a polarization device such as a polarization splitter, a polarization combiner or a polarization splitter rotator including a waveguide having a light absorber at an end section with an at least hook shape, e.g., it can be hooked or spiral shape. The structure also includes another waveguide adjacent the stated waveguide. The hook or spiral shape acts as a light absorber that reduces undesired optical noise such as excessive light insertion loss and/or light scattering. The hook or spiral shape may also be used on supplemental waveguides used to further filter and/or refine an optical signal in one of the waveguides of the polarization device, e.g., downstream of an output section of the polarization splitter and/or rotator.

18 Claims, 9 Drawing Sheets

(56) References Cited

U.S. PATENT DOCUMENTS

| | | |
|---|---|---|
| 10,816,728 B1 | 10/2020 | Bian et al. |
| 10,996,398 B1 | 5/2021 | Bian et al. |
| 11,079,544 B2 | 8/2021 | Bian et al. |
| 11,125,944 B2 | 9/2021 | Bian et al. |
| 11,307,353 B2* | 4/2022 | Kamata .................. H01S 5/142 |
| 11,353,654 B2 | 6/2022 | Bian |
| 2006/0120657 A1 | 6/2006 | Little |
| 2014/0185979 A1* | 7/2014 | Evans ................ G02B 6/12014 385/14 |
| 2017/0023735 A1* | 1/2017 | Barwicz ............... G02B 6/2773 |
| 2017/0254976 A1* | 9/2017 | Yamazaki ............... H01S 5/142 |
| 2022/0120966 A1 | 4/2022 | Liu et al. |

OTHER PUBLICATIONS

Bian et al., "3D Integrated Laser Attach Technology on 300-mm Monolithic Silicon Photonics Platform," 978-1-7281-5891-4/20, IEEE 2020, 2 pages.

Bian et al., "Towards low-loss monolithic silicon and nitride photonic building blocks in state-of-the-art 300mm CMOS foundry," FW5D.2, Frontiers in Optics, Laser Science, OSA 2020, 2 pages.

Bian et al., "Monolithically integrated silicon nitride platform," Th1A.46, OFC 2021, OSA 2021, 3 pages.

Bian et al., "Hybrid III-V laser integration on a monolithic silicon photonic platform," M5A.2, OFC 2021, OSA 2021, 3 pages.

Bogaerts et al., "Silicon-on-Insulator Spectral Filters Fabricated with CMOS Technology," IEEE Journal of Selected Topics in Quantum Electronics, 16:33-44, Jan./Feb. 2010, 12 pages.

Chowdhury et al., "High Performance Avalanche Photodiode in a Monolithic Silicon Photonics Technology," W3D.1, OFC 2022, Optical Publishing Group 2022, 3 pages.

Ding et al., "Wideband polarization splitter and rotator with large fabrication tolerance and simple fabrication process," Optics Letters, 38:1227-1229, 2013, 4 pages.

Fang et al., "Polarization Beam Splitter Based on Si3N4/SiO2 Horizontal Slot Waveguides for On-Chip High-Power Applications," Sensors, 20:2862, 2020, 13 pages.

Giewont et al., "300-mm Monolithic Silicon Photonics Foundry Technology," IEEE Journal of Selected Topics in Quantum Electronics, 25:8200611, Sep./Oct. 2019, 12 pages.

Lee et al., "Automatic Waveguide Balancing Using Point Set Operations," M3E.2, OFC 2022, Optical Publishing Group 2022, 3 pages.

Li et al., "Spiral Waveguides on Germanium-on-Silicon Nitride Platform for Mid-IR Sensing Applications" IEEE Photonics Journal, 10:2201107, Jun. 2018, 8 pages.

Peng et al., A CMOOS Compatible Monolithic Fiber Attach Solution with Reliable Performance and Self-Alignment, Th31.4, OFC 2020, OSA 2020, 3 pages.

Rakowski et al., "45nm CMOS—Silicon Photonics Monolithic Technology (45CLO) for next-generation, low power and high speed optical interconnects," T3H.3, OFC 2020, OSA 2020, 3 pages.

Sacher et al., "Polarization rotator-splitters in standard active silicon photonics platforms," Optics Express, 22:3777-86, Feb. 24, 2014, 10 pages.

Socci et al., "300 nm bandwidth adiabatic SOI polarization splitter-rotators exploiting continuous symmetry breaking," Optics Express, 23:19261-71, Jul. 27, 2015, 11 pages.

Su et al., "Four-port integrated polarizing beam splitter," Optics Letters, 39:965-68, 2014, 4 pages.

* cited by examiner

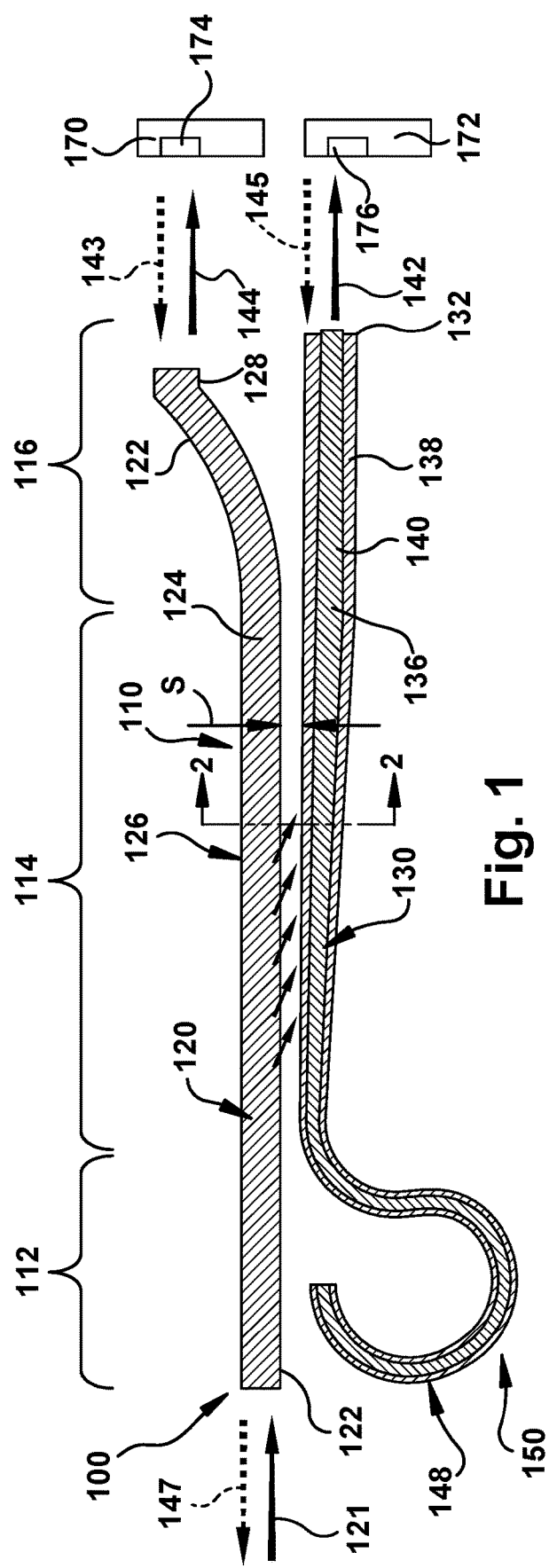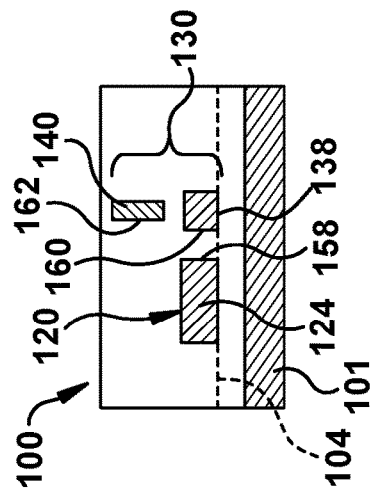

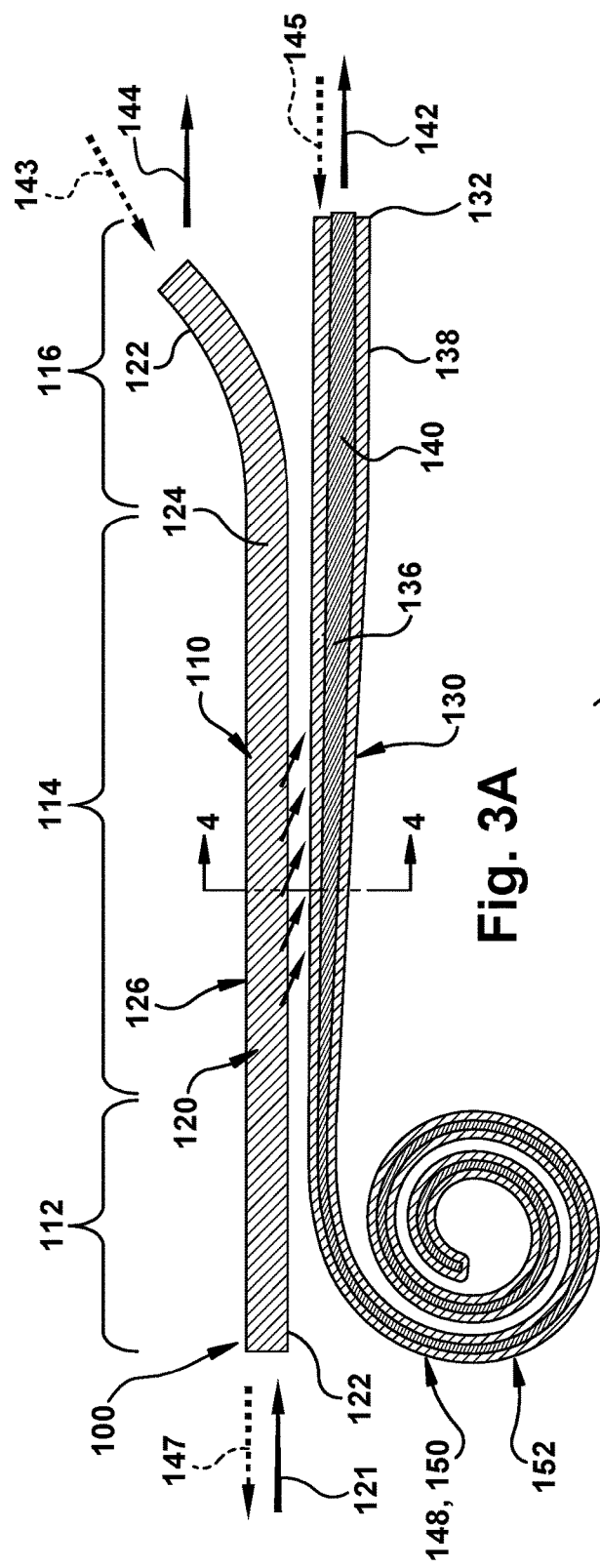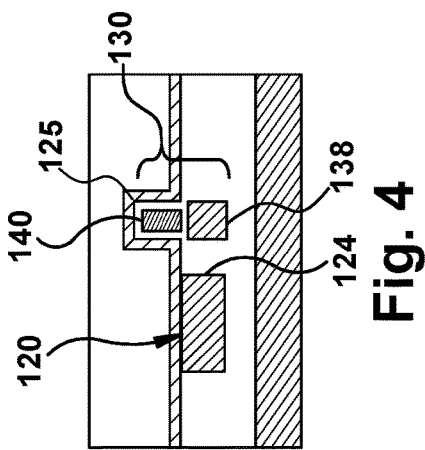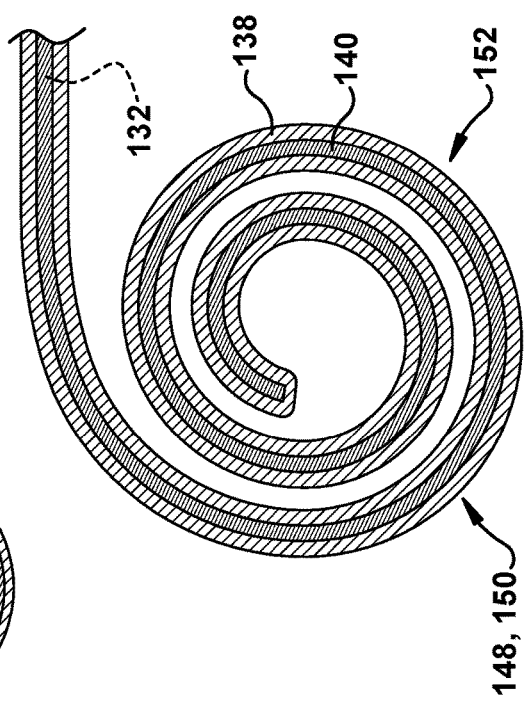

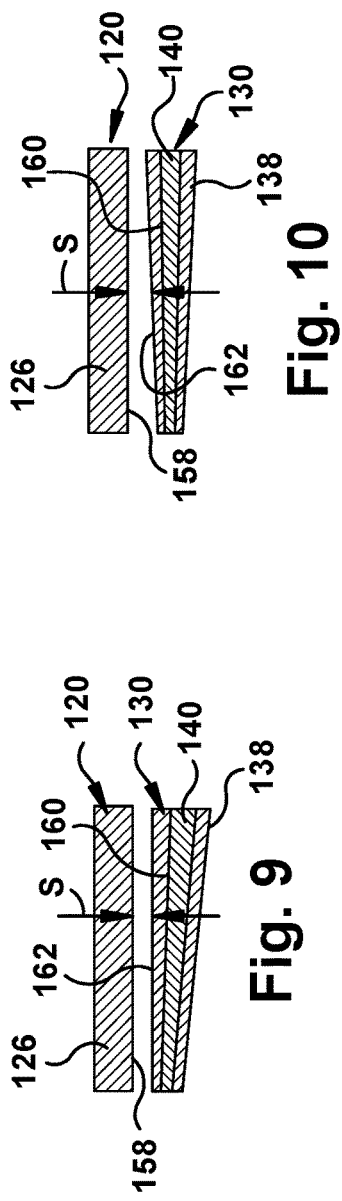
Fig. 9
Fig. 10
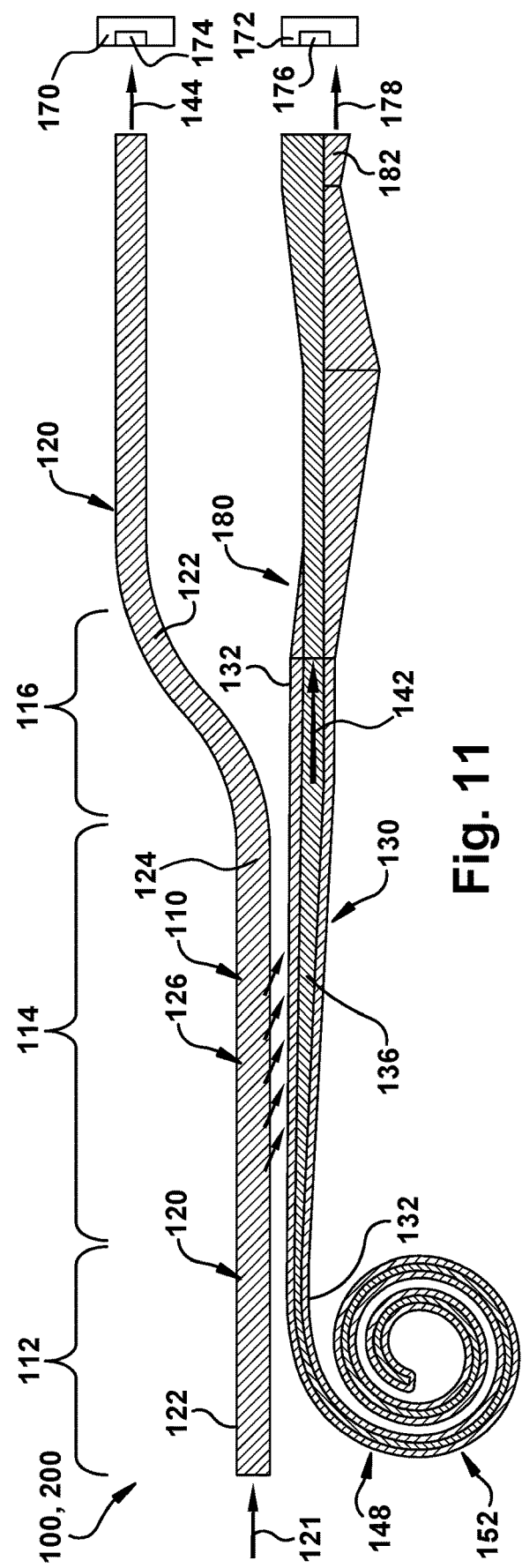
Fig. 11

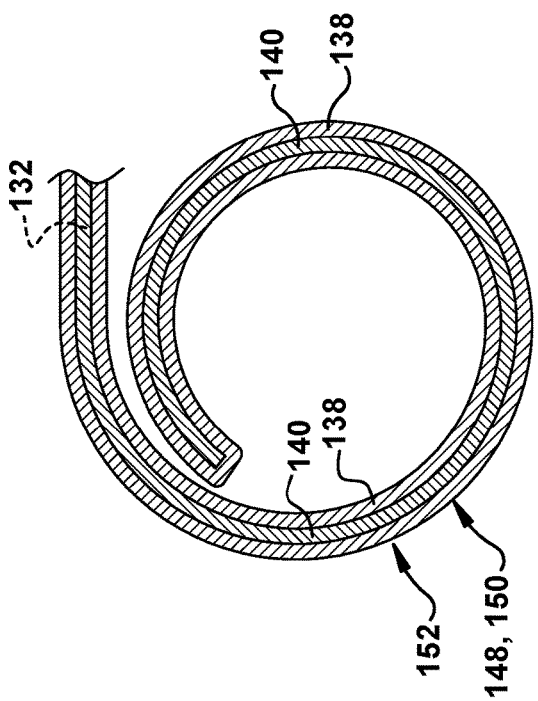
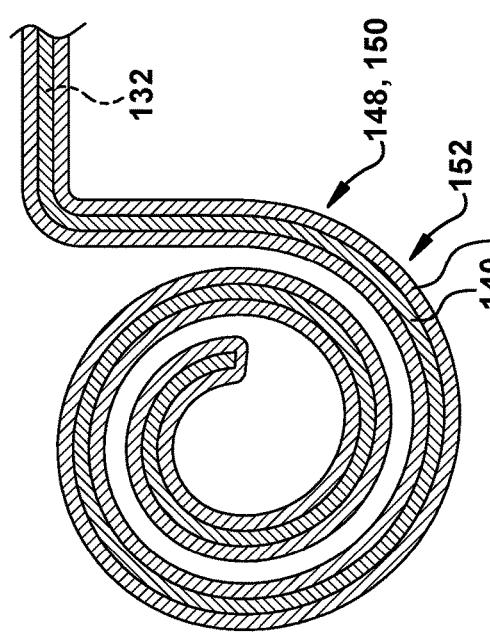
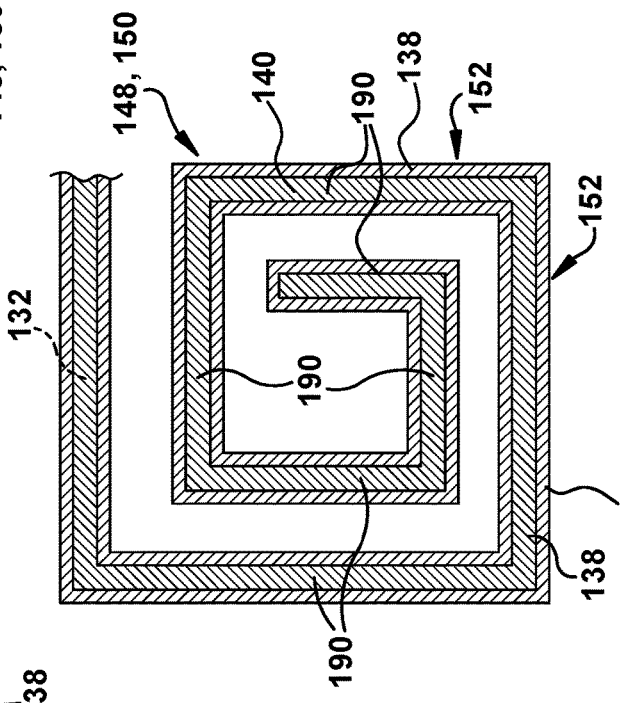
Fig. 13
Fig. 14
Fig. 12

STRUCTURE WITH POLARIZATION DEVICE WITH LIGHT ABSORBER WITH AT LEAST A HOOK SHAPE

BACKGROUND

The present disclosure relates to photonic integrated circuit (PIC) structures and, more particularly, to a structure including a polarization device, such as a splitter, a combiner or a splitter rotator, with a light absorber having at least a hook shape.

Photonics integrated circuit (PIC) structures integrate photonics components and integrated circuits on a single chip. When a light source is used to input light into a waveguide on a PIC structure, the polarization of the light must be carefully controlled because the performance of the photonics components is sensitive to the orientation of the polarization state, e.g., transverse electric (TE) or transverse magnetic (TM). However, the input light from, for example, an optical fiber or a laser, can be random. Hence, the light input to a PIC structure must have the polarization state processed for it to be oriented properly for use. A polarization splitter and rotator (PSR) is used for this purpose. Polarization splitters can split an incoming optical signal (light) into transverse electric mode (TE) light and transverse magnetic mode (TM) light. A polarization rotator converts one mode of light to another, e.g., TM to TE light. The splitter structure may be bi-directional, meaning it can also be used as a polarization combiner.

Existing polarization splitter, combiner and/or rotator structures include a first waveguide, e.g., of silicon alone, spaced from a second waveguide, e.g., of silicon and silicon nitride (Si—SiN). The second waveguide has a curved shape at an end thereof. Similar curved shapes may be used in supplemental waveguides downstream of the splitter structures that are used to further refine and/or filter the optical signals. Regardless of the waveguide in which used, formation of the waveguides, and in particular, the curved shape thereof, can result in process induced defects. During use, the defects can create undesired optical noise such as excessive light insertion loss and/or light scattering.

SUMMARY

All aspects, examples and features mentioned below can be combined in any technically possible way.

An aspect of the disclosure provides a structure comprising: a first waveguide having first end sections and a first coupling section between the first end sections, the first waveguide including a first core; and a second waveguide having second end sections and a second coupling section between the second end sections and adjacent the first coupling section, the second waveguide including a second core positioned laterally adjacent the first core and an additional second core stacked vertically with the second core, and wherein a selected one of the second end sections has at least a hook shape.

An aspect includes a structure comprising: a polarization splitter rotator (PSR), including: a polarization splitter including: a first waveguide having first end sections and a first coupling section between the first end sections, the first waveguide including a first core; and a second waveguide having second end sections and a second coupling section between the second end sections and adjacent the first coupling section, the second waveguide including a second core positioned laterally adjacent the first core and an additional second core stacked vertically with the second core, and wherein a selected one of the second end sections has at least a hook shape; and a polarization rotator operatively coupled to the other second end section of the second waveguide, wherein a first core material of the first core and a second core material of the second core both include the same material, and an additional second core material of the additional second core includes a different material than the first core material and the second core material.

An aspect of the disclosure includes a structure comprising: a first waveguide having first end sections and a first coupling section between the first end sections, the first waveguide including a first core; and a second waveguide having second end sections and a second coupling section between the second end sections and adjacent the first coupling section, the second waveguide including a second core positioned laterally adjacent the first core and an additional second core stacked vertically with the second core, and wherein a selected one of the second end sections has a spiral shape.

Two or more aspects described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein:

FIG. 1 shows a schematic top-down view of a structure including a light absorber on an end section of a polarization splitter or combiner, according to embodiments of the disclosure.

FIG. 2 shows a cross-sectional view along view line 2-2 in FIG. 1.

FIG. 3A shows a schematic top-down view of a structure including a light absorber on an end section of a polarization splitter or combiner, according to other embodiments of the disclosure.

FIG. 3B shows an enlarged view of a light absorber for an end section of a waveguide having a spiral shape, according to other embodiments of the disclosure.

FIG. 4 shows a cross-sectional view along view line 4-4 in FIG. 3A.

FIG. 9 shows an enlarged view of a coupling region of two waveguides of a polarization splitter or combiner, according to embodiments of the disclosure.

FIG. 10 shows an enlarged view of a coupling region of two waveguides of a polarization splitter or combiner, according to other embodiments of the disclosure.

FIG. 11 shows a schematic top-down view of a structure including a light absorber on an end section of a polarization splitter rotator, according to embodiments of the disclosure.

FIG. 12 shows an enlarged view of a light absorber for an end section of a waveguide having a spiral shape, according to other embodiments of the disclosure.

FIG. 13 shows an enlarged view of a light absorber for an end section of waveguide having a spiral shape, according to additional embodiments of the disclosure.

FIG. 14 shows an enlarged view of a light absorber for an end section of a waveguide having a spiral shape, according to yet other embodiments of the disclosure.

Figure 6:
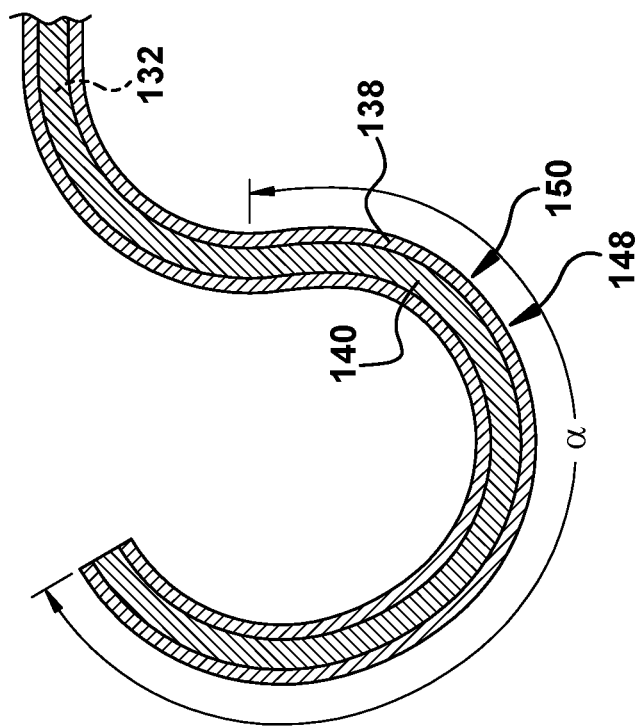
FIG. 6 shows an enlarged view of a light absorber including an end section having a hook shape, according to other embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, section, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (a) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure includes a structure including a polarization splitter, a polarization combiner, or a polarization splitter rotator (PSR) including a waveguide having an end section with at least a hook shape. The structure also includes another waveguide adjacent the noted waveguide. The hook shape, which can in certain embodiments be spiral shaped, acts as a light absorber to reduce undesired optical noise such as excessive light insertion loss and/or light scattering. The hook or spiral shape may also be used on supplemental waveguides used to further filter and/or refine an optical signal in one of the waveguides of the polarization splitter or PSR, e.g., downstream of an output section of the polarization splitter or PSR.

FIG. 1 shows a schematic top-down view of a structure 100 including a polarization splitter or combiner 110 (hereafter "PSC 110") according to embodiments of the disclosure. FIG. 2 shows a cross-sectional view of structure 100 along view line 2-2 in FIG. 1. PSC 110, also referred to as a polarization beam splitter or polarization beam combiner, is an optical component that is bi-directional and either splits a beam of light (optical signal) into TE polarization light and TM polarization light if light passes from left-to-right as shown (see solid arrows), or combines two beams of light (TE or TM polarization light beams) into a single light beam if light passes from right-to-left as shown (see dashed arrows). For purposes of description, PSC 110 will be described mainly as a splitter with an input region 112, a coupling region 114 and an output region 116.

PSC 110 includes a first, "input" waveguide 120 (hereinafter "first waveguide 120") through which an optical signal 121 (light) is input. PSC 110 also includes a stacked "splitter" or "combiner" waveguide 130 (herein "second waveguide 130"). First waveguide 120 may be coupled to optical signal 121 in any now known or later developed fashion. For example, an optical fiber or laser may be attached to structure 100 using a V-groove connection.

As shown in FIG. 2, structure 100 can include a substrate 101. Substrate 101 can be, for example, a semiconductor substrate, such as a silicon substrate. Substrate 101 can have a first surface (e.g., a bottom surface) and a second surface (e.g., a top surface) opposite the first surface. Optionally, structure 100 can further include an insulator layer 104 (dashed box) on the second surface of substrate 101. Insulator layer 104 can be, for example, a silicon dioxide layer (also referred to herein as a buried oxide (BOX) layer) or a layer of some other suitable insulator material.

First waveguide 120 may include first end sections 122 and a first coupling section 126 between first end section 122. First waveguide 120 includes any now known or later developed core material, e.g., silicon. Second waveguide 130 includes second end sections 132 and a second coupling section 136 between second end sections 132. Second waveguide 130 includes a second core 138 positioned laterally adjacent first core 124 of first waveguide 120 and an additional second core 140 stacked vertically with second core 138. Note, FIG. 1 shows additional (upper) second core 140 smaller than (lower) second core 138 for illustration purposes. The cores 138, 140 may have the same width, or additional second core 140 may be thinner in width than second core 138 (see FIG. 2). While second waveguide 130 is shown including two second cores 138, 140, more than two second cores can be used, e.g., three or more cores can be vertically positioned. Each first end section 122 and second end section 132 can have a corresponding I/O port distal to the respective coupling sections 126, 136.

In the example shown, first waveguide 120 includes a core material for its first core 124 including silicon, e.g., crystalline silicon or amorphous silicon with a refractive index of 3 or larger and typically between 3.3 and 3.6. First core material for first core 124 and a second core material for second core 138 may both include the same material, e.g., crystalline silicon or amorphous silicon. Additional second core material of additional second core 140 includes a different material than the material(s) of first core 124 and second core 138. Second cores 138, 140 can include any combination of core materials suitable for forming second waveguide 130. For example, as shown in FIGS. 1 and 2, second core 138 could include silicon, e.g., crystalline silicon or amorphous silicon with a refractive index of 3 or larger and typically between 3.3 and 3.6, and additional second core 140 could include a silicon nitride with a refractive index of approximately 2.0. FIG. 3A shows a schematic top-down view of a structure 100 including PSC 110, and FIG. 4 shows a cross-sectional view of structure 100 along view line 4-4 in FIG. 3A according to other embodiments of the disclosure. As shown in FIGS. 3A and 4, in an alternative embodiment, first core 124 and second core 138 include silicon and additional second core 140 includes polysilicon.

Other combinations of suitable core materials may be selected from but are not limited to: crystalline silicon (c-Si), amorphous silicon (a-Si), polysilicon (polySi), silicon germanium (SiGe), polysilicon germanium (polySiGe), silicon nitride (SiN), silicon oxynitride (SiON), gallium nitride (GaN), and aluminum nitride (AlN). Waveguides 120, 130 can further include waveguide cladding 125 surrounding and immediately adjacent to the surfaces of cores 124, 138, 140. The function of waveguide cladding 125 is to confine the optical signals within the waveguide core by reflection at interfaces between the core and cladding materials. Waveguide cladding 125 adjacent to the cores can be a single cladding material. Alternatively, waveguide cladding 125 can be made up of different cladding materials adjacent to different regions and/or different surfaces of the cores. In any case, to facilitate and control optical signal propagation within the cores, the refractive index of the cladding material used (or the refractive indices of the different cladding materials used, if applicable) should be smaller than the refractive index (or the multiple refractive indices) of the core material. Those skilled in the art will recognize that the same material may be incorporated into one waveguide for a respective core and in another waveguide for the waveguide cladding. For example, if first core 124 is silicon with a refractive index between 3.3 and 3.6, cladding 125 surrounding core 124 could be silicon dioxide ($SiO_2$), which as a refractive index of less 1.6, or silicon nitride, which has a refractive index of approximately 2. If additional second core 140 is silicon nitride with a refractive index of approximately 2.0, cladding 125 surrounding additional second core 140 could also be silicon dioxide. The various cladding materials mentioned above are provided for illustration purposes. Alternatively, any other suitable cladding material could be used, depending upon the core material. The following is a list of possible materials (including the refractive indices (n) thereof) that could potentially be incorporated into a waveguide as cladding material or core material, depending upon the selected materials and the refractive index differential between them (i.e., as long as the cladding material has a smaller refractive index than the core material it clads): hafnium dioxide ($HfO_2$), n=2.0754 @1.31 um, n=2.0709 @1.55 um; zirconium dioxide ($ZrO_2$), n=2.1155 @1.31 um, n=2.1103 @1.55 um; silicon nitride ($Si_3N_4$) n=~2; silicon oxide nitride (SiON) n=~1.46 to ~2.1; aluminum nitride (AlN), n=~2.1 to ~2.4; titanium dioxide ($TiO_2$), n=2.4622 @1.31 um, n=2.4538 @1.55 um; zinc monoxide (ZnO), n=1.9318 @1.31 um, n=1.9267 @1.55 um; aluminum oxide ($Al_2O_3$), n=1.7503 @1.31 um, n=1.7462 @1.55 um; magnesium oxide (MgO), n=1.7178 @1.31 um, n=1.7146 @1.55 um; silicon dioxide ($SiO_2$), n<1.6, n=1.45 @1.31 um; calcium fluoride ($CaF_2$), n=1.4272 @1.31 um, n=1.4260 @1.55 um; octamethylcyclotetrasiloxane (OMCTS) [$(CH_3)_2SiO]_4$ (SiCOH), n=1.406 @1.31 um; and magnesium fluoride ($MgF_2$), n=1.3718 @1.31 um, n=1.3705 @1.55 um.

Each waveguide 120, 130 generally has a linear, strip/wire geometry. That is, waveguides 120, 130 can include an elongated body with a vertical cross-sectional shape of this elongated body cutting across its width that is essentially rectangular with a planar bottom surface, a planar top surface opposite the planar bottom surface, and opposing sidewalls. Alternatively, waveguides 120, 130 could have some other suitable cross-sectional geometry, e.g., a rib geometry. The height of the elongated body of first core 124 and second cores 138, 140 can be essentially uniform from one end to the other. The width of the elongated body of first core 124 can also be essentially uniform (as illustrated). Alternatively, as will be described further herein, the width of the elongated body of first core 124 and/or second cores 138, 140 could be tapered. Optionally, one or both of the various I/O ports can also be tapered (as discussed in greater detail below regarding FIGS. 7-8). Within first coupling section 126, first core 124 can be essentially linear. Within one or both of first end sections 122, first core 124 can be curved.

Figure 5:
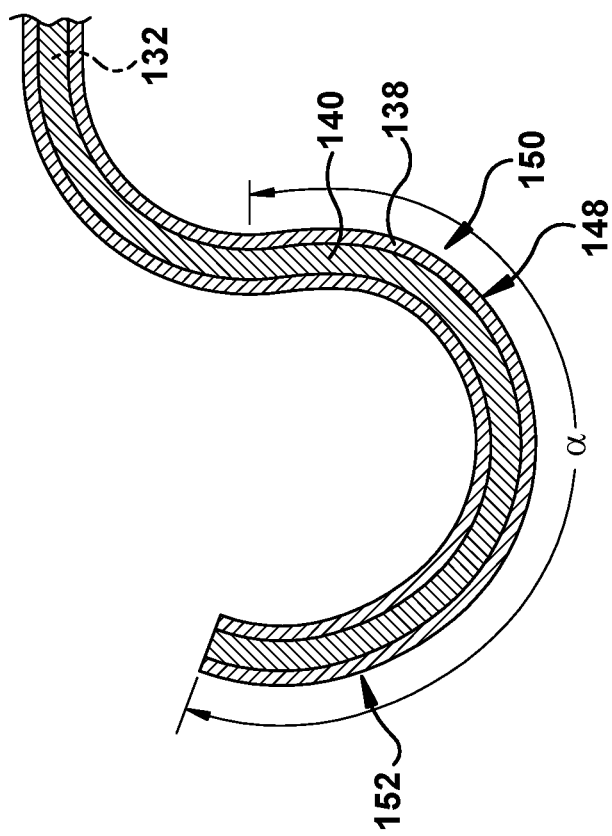
FIG. 5 shows an enlarged view of a light absorber including an end section having a hook shape, according to embodiments of the disclosure.

In accordance with embodiments of the disclosure, second waveguide 130 includes a selected one of second end sections 132 having a light absorber 148 thereon. More particularly, second waveguide 130 has a selected one of second end sections 132 having at least a hook shape 150 (hereafter "hook end 150") that creates light absorber 148. FIGS. 5 and 6 show enlarged views of illustrative embodiments of a hook end 150. As shown in FIGS. 5 and 6, as used herein, "at least hook shape" indicates cores 138, 140 curve back from a point at which they start to turn in their final direction of turn (e.g., clockwise) from end section 132 to extend about an angle α of at least 120°, but do not reach 360° (circular). In other embodiments, as shown in FIG. 3A, hook shape 150 on end section 132 may be a spiral shape (hereinafter "spiral end 152") having at least a (generally) circular path with a radially overlapping portion. FIG. 3B shows an enlarged view of a light absorber for an end section of a waveguide having spiral end 152 as in FIG. 3A. As used herein, "spiral" indicates cores 138, 140 curve in a continuous and gradually widening (or tightening) curve around a central point on a flat plane, and have at least one radially overlapping portion, i.e., at least circular path with overlapping portion. Hook end 150 or spiral end 152 include the same cores 138, 140 as the rest of second waveguide 130.

During use, a vertical polarization (denoted transverse magnetic (TM) mode in a waveguide) couples more strongly with second waveguide 130 than a horizontal polarization (denoted transverse electric (TE) mode in a waveguide). Positioning first waveguide 120 in proximity to second waveguide 130 in coupling region 114, as shown in FIGS. 1 and 3A, causes TM polarization light 142 (see also arrows between waveguides 120, 130) to be removed from first waveguide 120 and propagate through second waveguide 130. At the same time, TE polarization light 144 continues to propagate in first waveguide 120. Outside of coupling region 114, waveguides 120, 130 may diverge from one another, see for example, curved second end section 122 in first waveguide 120 in output region 116. As noted, process induced defects from formation of waveguides 120, 130 can result in defects that can create undesired optical noise such as excessive light insertion loss and/or light scattering. Light absorber 148 in the form of hook end 150 or spiral end 152 minimizes or eliminates light insertion loss and light scattering. In the example shown, light absorber 148 is in input region 112 of PSC 110, and thus acts to minimize or eliminate light insertion loss and light scattering in input region 112.

Figure 7:
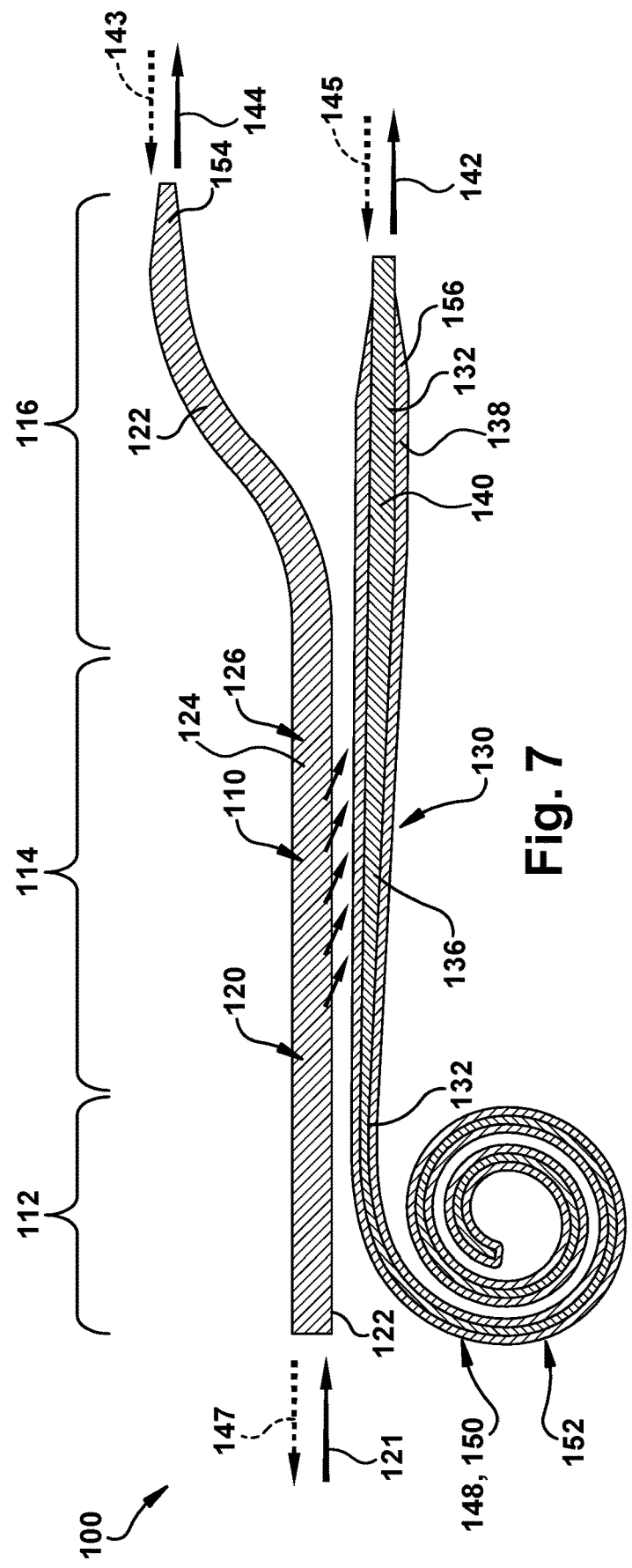
FIG. 7 shows a schematic top-down view of a structure including a light absorber on an end section of a polarization splitter or combiner, according to other embodiments of the disclosure.
Figure 8:
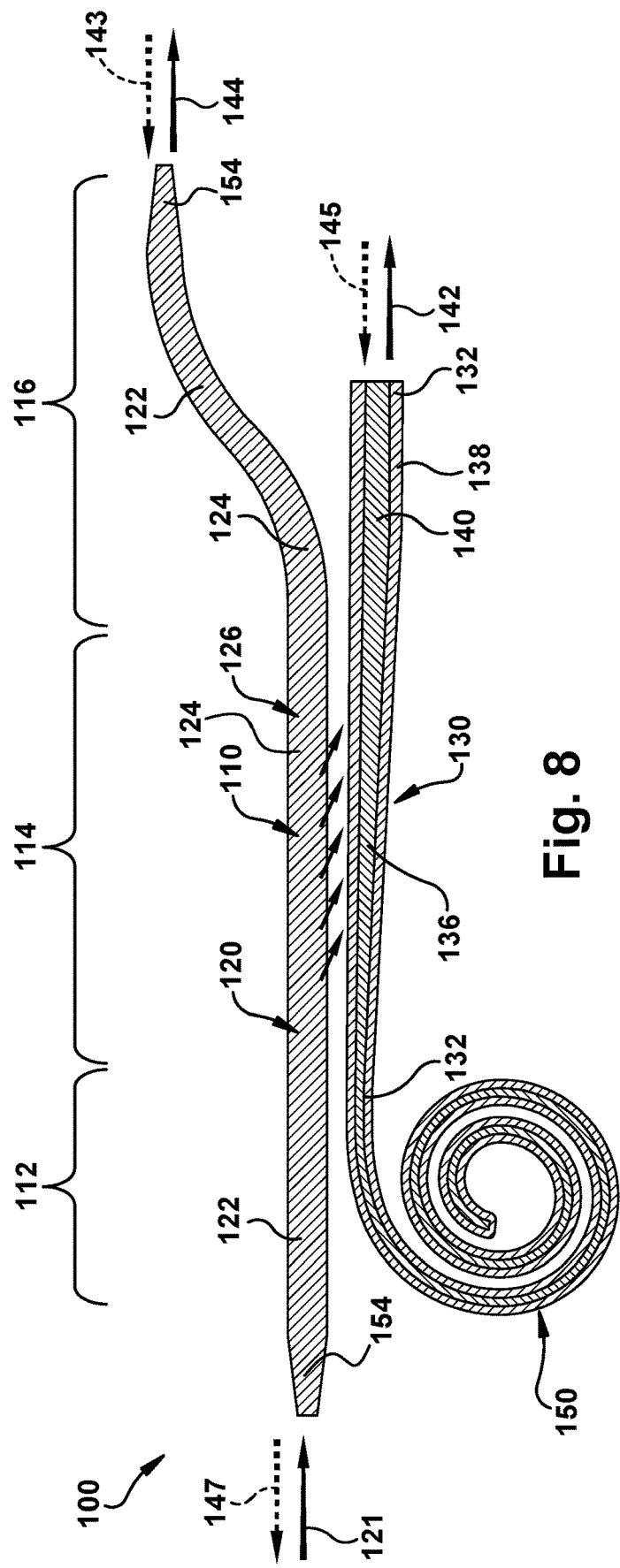
FIG. 8 shows a schematic top-down view of a structure including a light absorber on an end section of a polarization splitter or combiner, according to additional embodiments of the disclosure.

FIGS. 7 and 8 show schematic top-down views of structure 100 including PSC 110, according to alternative embodiments. In FIGS. 7 and 8, at least one of first end sections 122 of first waveguide 120 (both shown) may optionally include a tapered end 154, i.e., I/O ports thereat are tapered. As shown in FIG. 7, second waveguide 130 includes a tapered end 156 in at least one of second core 138 and additional second core 140 (latter shown), i.e., an I/O port thereat may be at least partially tapered. As used herein, "tapered" indicates the width of the respective core(s) decrease or increases along their respective length(s) in a given direction.

In FIGS. 1, 3A, 7 and 8, and as shown in an enlarged top-down view in FIG. 9, first waveguide 120 is linear and second waveguide 130 tapers along its length in a manner that a spacing S between first waveguide 120 and second waveguide 130 is uniform in coupling region 114, i.e., in first coupling section 126 and second coupling section 136. That is, spacing S does not change in coupling region 114 where TM polarization light 142 is captured from first waveguide 120. In the FIG. 9 example, second waveguide 130 widens left-to-right on the page; it could also narrow. FIG. 10 shows an enlarged top-down view of waveguides 120, 130 according to an alternative embodiment. In other embodiments, first waveguide 120 is linear and second waveguide 130 tapers along its length in a manner that a spacing S between second waveguide 130 and first waveguide 120 is non-uniform in coupling region 114, i.e., in first coupling section 126 and second coupling section 136. That is, spacing S changes in coupling region 114 where TM polarization light 142 is captured from first waveguide 120. In the example shown, spacing S decreases in coupling region 114 as light passes through waveguides 120, 130 from input region 112 to output region 116. The opposite arrangement is also possible. FIG. 9 also shows a first sidewall 158 of first core 124 in first coupling section 126 (e.g., FIGS. 1, 3A, 7) may be angled relative to at least one of a sidewall 160 of second core 138 (shown) and a sidewall 162 of additional second core 140 in second coupling section 136 (e.g., FIGS. 1, 3A, 7). FIG. 10 also shows first sidewall 158 of first core 124 in first coupling section 126 (e.g., FIGS. 1, 3A, 7) may be angled relative to at least one of sidewall 160 of second core 138 and sidewall 162 (shown) of additional second core 140 in second coupling section 136 (e.g., FIGS. 1, 3A, 7). That is, they are not parallel. Sidewalls 158, 160, 162 are also labeled in FIG. 2 for reference purposes.

As shown in FIG. 1, first waveguide 120 and/or second waveguide 130 can have respective first and second end sections 122, 132 in output region 116 extending to, for example, a functional circuit block 170, 172 of structure 100, i.e., a PIC structure. Each end section 122, 132 can be configured to function as a coupler on one side of an optical interface that facilitates communication of light signals between waveguide(s) 120, 130 and an optical device 174, 176, e.g., a photodetector, within or operatively coupled to functional circuit blocks 170, 172. It will be recognized that optical signals from each waveguide 120, 130 may be used in a variety of applications, and in other arrangements as show, e.g., they could be outputted from structure 100.

FIG. 11 shows a schematic top-down view of structure 100 also including a polarization rotator 180 operatively coupled to second waveguide 130. Hence, structure 100 in FIG. 11 constitutes a polarization splitter rotator (PSR) 200. Polarization rotator 180 may include any now known or later developed structure for converting TM polarization light 142 to TE polarization light 178. Polarization rotator 180 is operatively coupled to the other end section 132 of second waveguide 130 opposite light absorber 148, e.g., hook end 150 or spiral end 152. As shown in FIG. 11, first waveguide 120 and/or polarization rotator 180 can have a respective end section 122, 182 extending to, for example, functional circuit block(s) 170, 172 of structure 100, i.e., PIC structure. Each end section 122, 182 can be configured to function as a coupler on one side of an optical interface that facilitates communication of light signals between waveguide(s) 120, 130 and optical device(s) 174, 176, e.g., a photodetector, within or operatively coupled to functional circuit block(s) 170, 172. It will be recognized that TE polarization light 144 from first waveguide 120 and TE polarization light 178 from polarization rotator 180 may be input into a single functional circuit block with a single optical device. Alternatively, TE polarization light 144 from first waveguide 120 and TE polarization light 178 from polarization rotator 180 may be combined prior to input into a single functional circuit block with a single optical device, e.g., as will be described herein, using a polarization combiner having similar structure to PSC 110 but operated in reverse.

Figure 15:
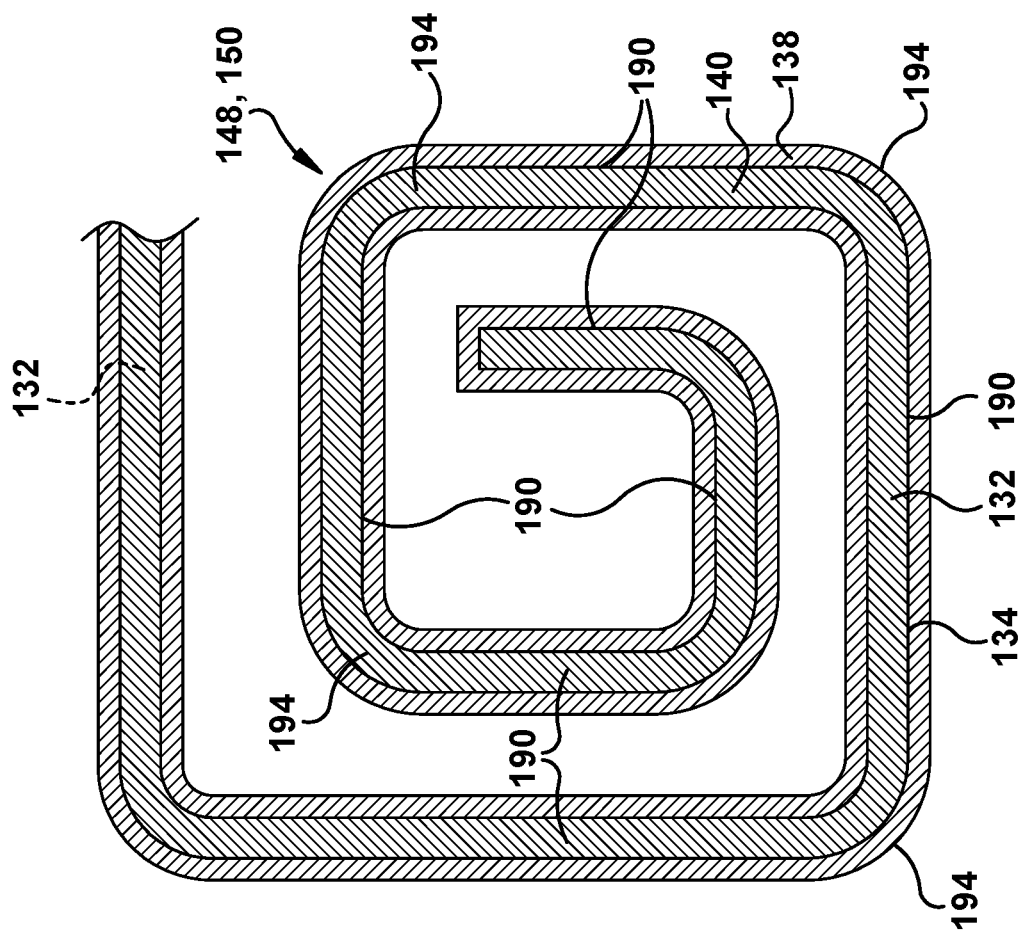
FIG. 15 shows an enlarged view of a light absorber for an end section of a waveguide having a spiral shape, according to additional embodiments of the disclosure.

Spiral end 152 can have a variety of alternative configurations of spiral shapes. FIGS. 12-15 show top-down views of various embodiments of spiral end 152. As noted, "spiral" indicates cores 138, 140 curve in a continuous and gradually widening (or tightening) curve around a central point on a flat plane. In certain embodiments, spiral end 152 has a spiral shape having at least one radially overlapping portion or round. In certain embodiments, the spiral shape has at least a (generally) circular path with a radially overlapping portion. FIGS. 3A, 7, 8 and 11, for example, show spiral end 152 with at least a generally circular path with a radially overlapping portion extending in a counterclockwise direction from end section 132 of second waveguide 130. FIG. 12 shows an alternative embodiment of spiral end 152 with at least a generally circular path with radially overlapping portion extending in a clockwise direction from end section 132 of second waveguide 130. FIG. 13 shows spiral end 152 with at least a generally circular path with overlapping portion extending in a counterclockwise path from end section 132 of second waveguide 130, but with only one short, partially radially overlapping portion. FIG. 14 shows spiral end 152 with a spiral shape having a plurality of linear segments 190 forming a polygonal path. Any polygonal shape can be used, e.g., square, rectangular, pentagonal, etc. FIG. 15 shows spiral end 152 with a spiral shape having a plurality of linear segments 190 forming a polygonal path, similar to FIG. 14, but with a corner 194 of at least one pair of adjacent linear segments 190 (four shown) of plurality of linear segments 190 forming the polygonal path being curved. That is, spiral end 152 includes linear segments 190 with at least one pair of adjacent linear segments 190 joined by corner 194 of second cores 138, 140 that is curved, e.g., with any desired radius.

Figure 16:
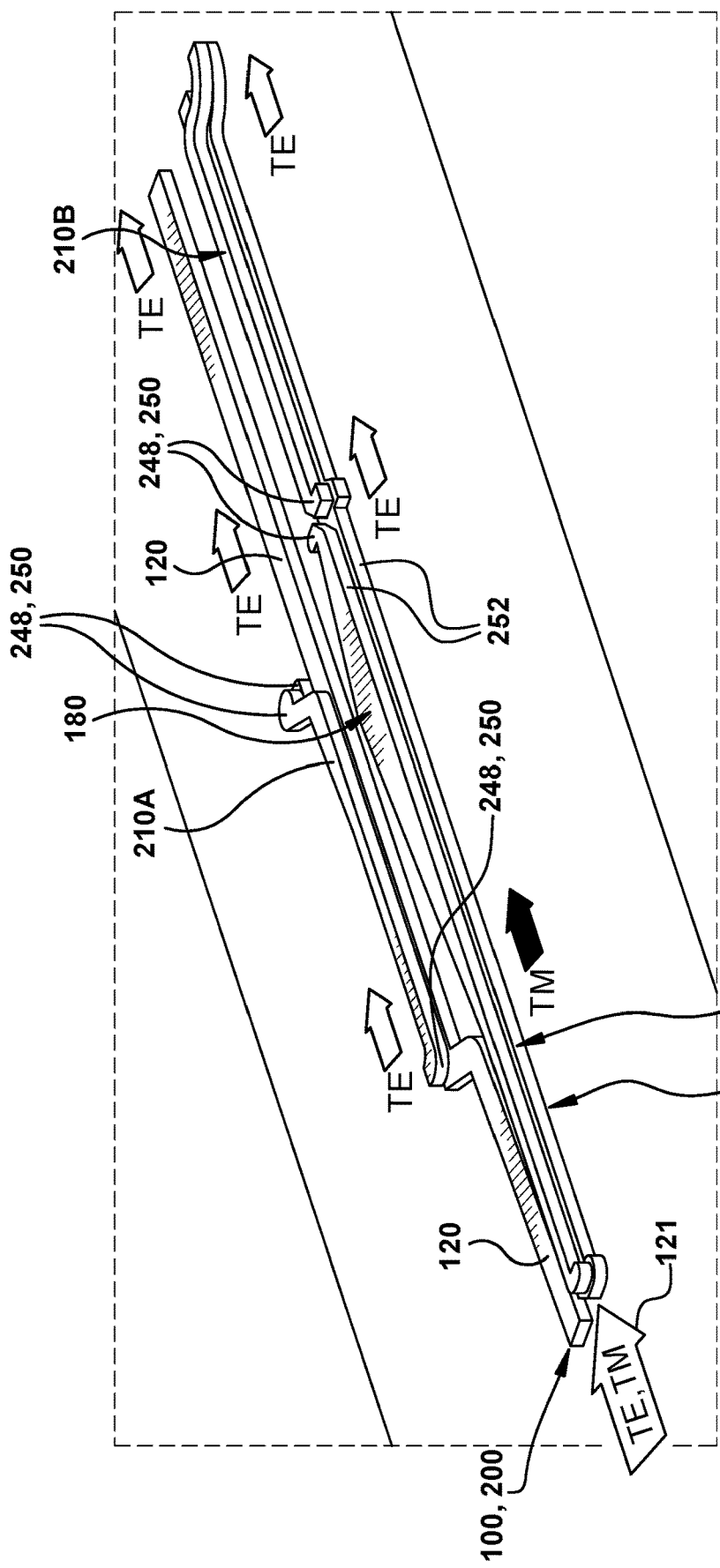
FIG. 16 shows a schematic top-down view of a structure including a polarization splitter rotator including various supplemental waveguides with light absorbers on an end section thereof, according to embodiments of the disclosure.

FIG. 16 shows a perspective view of a structure 100 according to alternative embodiments. While spiral end 152 is shown in the previous embodiments as used on an input region 112 of structure 100 in the form of PSC 110 or PSR 200, a light absorber 248 including an at least hook end 250, e.g., a hook or spiral end, may also be used in structure 100 in any location in which process induced defects can cause optical noise. For example, as shown in FIG. 16, hook end 250 may be used on a downstream end 252 of polarization rotator 180.

FIG. 16 also shows structure 100 including at least one supplemental waveguide 210 adjacent one of second waveguide 130 and first waveguide 120. In the example shown, two supplemental waveguides 210A, 210B (collectively 210) are illustrated, one adjacent first waveguide 120 and one adjacent second waveguide 130. Supplemental waveguides 210 can include any dielectric core material listed herein, e.g., silicon nitride. Supplemental waveguides 210 may be used to further filter and/or refine an optical signal in one of the waveguides 120, 130 of PSC 110, PSR 200 and/or polarization rotator 180. For example, supplemental waveguide 210A may filter and/or refine an optical signal in first waveguide 120 by further separating any remaining TM polarization light therein from first waveguide 120. In another example, supplemental waveguide 210B may filter and/or refine an optical signal in second waveguide 130, e.g., downstream of polarization rotator 180, by further separating any remaining TE polarization light from second waveguide 130. Supplemental waveguides 210 may suffer from the same challenges as second waveguide 130, e.g., process induced defects that cause light scattering. In accordance with embodiments of the disclosure, supplemental waveguide(s) 210 may include an end section with at least a hook shape, e.g., hook shape or spiral shape, creating a light absorber 248, similar to that described previously herein. Light absorber 248 can be used wherever process induced defects create undesired optical noise such as excessive light insertion loss and/or light scattering. FIG. 16 shows light absorber 248, such as a spiral end 250, on an upstream end of supplemental waveguide 210A, on a downstream end of supplemental waveguide 210A, and on an upstream end of supplemental waveguide 210B.

Returning to FIG. 11, PSR 200 includes PSC 110 including first waveguide 120 having end section 122 in input region 112 of the PSR, and second waveguide 130 including end section 132 having light absorber 148, e.g., hook end 150 as in FIG. 1 or spiral end 152 (shown). Light absorber 148 is adjacent end section 122 of first waveguide 120 in input region 112. PSR 200 also includes polarization rotator 180 operatively coupled to second waveguide 130, i.e., in optical communication therewith. Second waveguide 130 includes second core 138 and additional second core 140 of different materials, as previously described.

Structure 100 can be formed using any now known or later developed semiconductor fabrication techniques. Forming PSC 110 may include forming second waveguide 130 having end section 132 thereof with at least a hook shape and forming first waveguide 120 adjacent second waveguide 130. First core 124 of first waveguide 120 and second core 138 of second waveguide 130 may be formed as part of a patterning an active region for functional circuit blocks 170, 172 and/or other CMOS devices. Additional second core 140 can be, for example, a middle-of-line (MOL) SiN core. Additional second core 140 can be formed in the MOL some distance above the level of any front end of the line (FEOL) active or passive semiconductor devices and below the level of any back end of the line (BEOL) metal levels. Alternatively, additional second core 140 can be, for example, a back-end-of-line (BEOL) SiN core. Additional second core 140 may be formed using any now known or later developed technique, e.g., by forming a trench in a relevant interlayer dielectric over second core 138, depositing silicon nitride and planarizing.

With further reference to FIGS. 1, 3A, 7 and 8, those with skill in the art will recognize that PSC 110 may be bi-directional. That is, while PSC 110 is described herein as a splitter that takes a random optical signal and splits it into two light beams (see solid arrows), it can also be used in an opposite direction to combine light beams (see dashed arrows). In a combining operation, output region 116 becomes an input region, and input region 112 becomes an output region. More particularly, polarization combiner has essentially the same input and second waveguide 120, 130 configuration. However, in this case, as shown by dashed arrows pointing to the left in FIGS. 1, 3A, 7 and 8, light signals of one mode (e.g., TE polarization light 143) are received at a first input of first end section 122 (right side) of first waveguide 120 and propagate toward a first output of the opposite first end section 122 (left side). Light signals of the opposite mode (e.g., TM polarization light 145) are received at a second input of second end section 132 (right side) of second waveguide 130 and propagate toward a second output at the opposite second end section 132 (left side). However, prior to these light signals reaching the respective opposite end sections 122, 132, some form of mode matching (e.g., TM-mode matching) occurs between first coupling section 126 and second coupling section 136 such that matched mode light signals pass from second waveguide 130 into first waveguide 120 and propagate toward the first output (left first end section 122). Thus, light signals of both modes (i.e., TE polarization light 143 and TM polarization light 145) are output from the first output (left first end section 122) of first waveguide 120, as a combined light 147.

Embodiments of the disclosure provide various technical and commercial advantages, examples of which are discussed herein. Structure 100 provides a splitter, combiner (PSC 110) or PSR 200 with a second waveguide with an end section having light absorber, e.g., a hook or spiral shape, which reduces undesired optical noise such as excessive light insertion loss and/or light scattering. Structure 100 also has a cleaner layout compared to conventional devices, removing design rule conflict issues when connecting with waveguides or other components. The hook or spiral shape light absorber may also be used on supplemental waveguides used to further filter and/or refine an optical signal in one of the waveguides of the polarization splitter, e.g., downstream of an output section of the polarization splitter and/or rotator. Light absorber 148 lowers scattering loss, especially when used in a combiner application. Light absorber 148 especially lowers excess light loss associated with silicon nitride cores. Structure 100 is fully compatible with CMOS fabrication techniques.

The structure and method as described above are used in the fabrication of photonics integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A structure comprising:
   a polarization splitter rotator (PSR), including:
   a polarization splitter including:
     a first waveguide having first end sections and a first coupling section between the first end sections, the first waveguide including a first core;
     a second waveguide having second end sections and a second coupling section between the second end sections and adjacent the first coupling section, the second waveguide including a second core positioned laterally adjacent the first core and a third core stacked vertically with the second core, and wherein a selected one of the second end sections has at least a hook shape; and
   a polarization rotator operatively coupled to the other second end section of the second waveguide
     wherein the second end section with the at least a hook shape is in an input region of the polarization splitter and the selected one of the second end section that has at least a hook shape acts as a light absorber to reduce undesired optical noise.

2. The structure of claim 1, wherein a first core material of the first core and a second core material of the second core both include the same material, and a third core material of the third core includes a different material than the first core material and the second core material.

3. The structure of claim 2, wherein the first core material and the second core material include silicon and the third core material includes one of silicon nitride and polysilicon.

4. The structure of claim 1, wherein the at least a hook shape includes a spiral shape having at least a circular path with overlapping portion.

5. The structure of claim 1, wherein the at least a hook shape includes a spiral shape having a plurality of linear segments forming a polygonal path.

6. The structure of claim 5, wherein a corner of at least one pair of adjacent linear segments of the plurality of linear segments of the polygonal path is curved.

7. The structure of claim 1, further comprising at least one supplemental waveguide adjacent one of the first waveguide and the second waveguide, wherein the supplemental waveguide includes an end section with at least a hook shape.

8. The structure of claim 1, wherein a spacing between the first waveguide and the second waveguide is uniform in the first coupling section and the second coupling section.

9. The structure of claim 1, wherein a spacing between the first waveguide and at least a portion of the second waveguide is non-uniform in the first coupling section and the second coupling section.

10. The structure of claim 9, wherein a first sidewall of the first core in the first coupling section is a non-parallel angle relative to at least one sidewall of the second core, wherein the sidewall of the second core is facing the first sidewall of the first core, and a sidewall of the third core in the second coupling section, wherein the sidewall of the third core is facing the first sidewall of the first core.

11. The structure of claim 1, wherein at least one of the first end sections of the first waveguide includes a tapered end.

12. A structure comprising:
   a polarization splitter rotator (PSR), including:
   a polarization splitter including:
     a first waveguide having first end sections and a first coupling section between the first end sections, the first waveguide including a first core;

a second waveguide having second end sections and a second coupling section between the second end sections and adjacent the first coupling section, the second waveguide including a second core positioned laterally adjacent the first core and a third core stacked vertically with the second core, and wherein a selected one of the second end sections has at least a hook shape; and a polarization rotator operatively coupled to the other second end section of the second waveguide, wherein the second end section with the at least a hook shape is in an input region of the polarization splitter and the selected one of the second end section that has at least a hook shape acts as a light absorber to reduce undesired optical noise, wherein a first core material of the first core and a second core material of the second core both include the same material, and a third core material of the third core includes a different material than the first core material and the second core material.

13. The structure of claim 12, wherein the first core material and the second core material include silicon and the third core material includes one of silicon nitride and polysilicon.

14. The structure of claim 12, wherein the at least a hook shape includes a spiral shape having at least a circular path with overlapping portion.

15. The structure of claim 12, wherein the at least a hook shape includes a spiral shape having a plurality of linear segments forming a polygonal path.

16. The structure of claim 15, wherein a corner of at least one pair of adjacent linear segments of the plurality of linear segments of the polygonal path is curved.

17. The structure of claim 12, further comprising at least one supplemental waveguide adjacent one of the first waveguide and the second waveguide, wherein the supplemental waveguide includes an end section with at least a hook shape.

18. A structure comprising:

a first waveguide having first end sections and a first coupling section between the first end sections, the first waveguide including a first core; and a second waveguide having second end sections and a second coupling section between the second end sections and adjacent the first coupling section, the second waveguide including a second core positioned laterally adjacent the first core and a third core stacked vertically with the second core, and wherein a selected one of the second end sections has a spiral shape, wherein a spacing between the first waveguide and at least a portion of the second waveguide is non-uniform in the first coupling section and the second coupling section, and a first sidewall of the first core in the first coupling section is a non-parallel angle relative to at least one sidewall of the second core, wherein the at least one sidewall of the second core is facing the first sidewall of the first core and a sidewall of the third core in the second coupling section, wherein the sidewall of the third core is facing the first sidewall of the first core, wherein the selected one of the second end section that has at least a spiral shape acts as a light absorber to reduce undesired optical noise.

* * * * *